Aug. 23, 1932.  J. H. GAULT  1,872,725
CUSPIDOR FOR AUTOMOBILES
Filed May 13, 1931
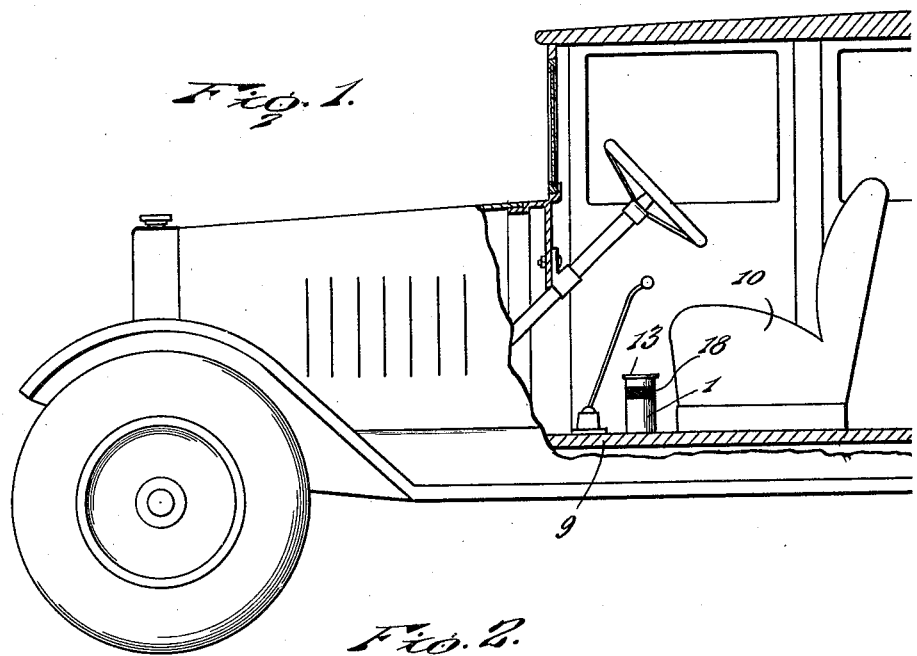
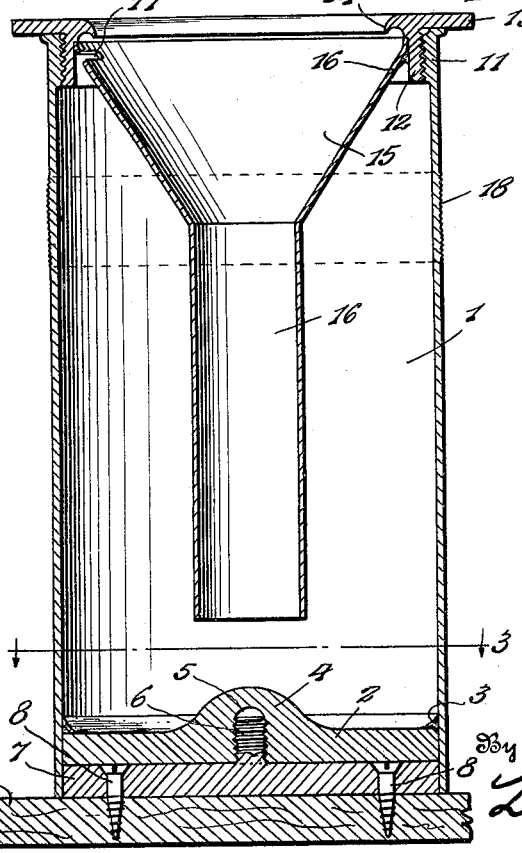
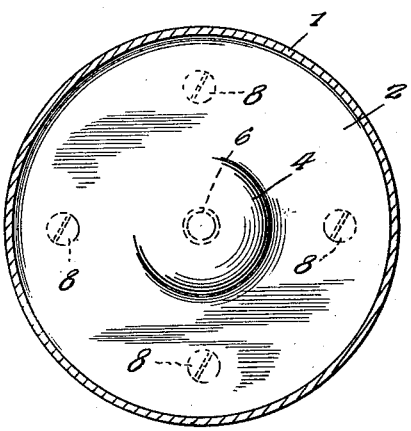
Inventor
J. H. Gault.
By Lacey & Lacey, Attorneys Patented Aug. 23, 1932

1,872,725

UNITED STATES PATENT OFFICE

JOSEPH H. GAULT, OF SAPULPA, OKLAHOMA

CUSPIDOR FOR AUTOMOBILES

Application filed May 13, 1931. Serial No. 537,117.

This invention relates to cuspidors and one object of the invention is to provide a cuspidor particularly adapted for use as an accessory for an automobile although it may be used wherever desired.

Another object of the invention is to so form the cuspidor that when it is in place it may be very firmly mounted and prevented from moving out of its proper position or turning over.

Another object of the invention is to not only permit the cuspidor to be firmly but releasably engaged with a mounting plate attached to the floor of the automobile, but also permit the lower portion of the walls of the cuspidor to engage about the mounting plate thereby concealing the mounting plate and in addition permit the cuspidor to be braced and prevented from being broken loose or tilted out of a vertical position in case it should be accidentally struck by a person getting into or leaving the automobile.

Another object of the invention is to permit the cuspidor to be easily detached from a mounting secured to the floor of the automobile in front of the driver's seat and applied to a similar mounting secured to the floor of the automobile in the rear portion of the car thereby permitting the cuspidor to be disposed in position for use either in the front or rear portion of the automobile.

Another object of the invention is to provide the cuspidor with a deflector removably mounted therein and serving to prevent contents of the cuspidor from being spilled.

Another object of the invention is to so form and mount the deflector that it may be firmly secured when in place but permitted to be easily detached when the cuspidor is to be emptied and to further provide the deflector with a vent which will permit air to escape when the deflector is applied thereby preventing an air cushion or vacuum being formed in the upper portion of the cuspidor about the deflector.

The invention is illustrated in the accompanying drawing wherein:

Figure 1 is a view showing the improved cuspidor mounted in front of the driver's seat of an automobile, Figure 2 is a sectional view taken vertically through the improved cuspidor, and Figure 3 is a sectional view taken transversely through the cuspidor along the line 3—3 of Figure 2.

The improved cuspidor comprises a cylindrical body or receptacle 1 which is formed of metal or any other material found suitable for the purpose and may be of any height and diameter desired. The bottom 2 which is of greater thickness than the walls of the receptacle is disposed in spaced relation to the lower edges of the walls and will have its marginal portions brazed or otherwise firmly secured in engagement with the walls of the receptacle. It should also be noted that a filling has been provided about the marginal portions of the bottom as shown at 3 thereby eliminating a sharp corner between the walls and the upper face of the bottom and causing the walls to merge into the bottom so that the receptacle may be thoroughly cleaned.

The central portion 4 of the bottom is extended upwardly as shown clearly in Figure 2 and in this thickened central portion is formed a threaded socket 5 which opens through the underface of the bottom and is intended to receive a stem or stud 6 projecting upwardly from the center of a mounting disc 7 having a thickness corresponding to the distance between the underface of the bottom and the lower edges of the walls of the receptacle. This mounting disc is of sufficient diameter to fit snugly within the lower portion of the body beneath the bottom and is formed with openings to receive a suitable number of screws 8 by means of which it is firmly secured in place upon the floor 9 of an automobile either in front of the driver's seat 10 as shown in Figure 1 or in the rear portion of the automobile. It will be understood that one of these mounting discs may be provided in front of the driver's seat and another in the rear portion of the automobile thereby permitting the cuspidor to be disposed in either position desired.

When the cuspidor is applied the stem or stud 6 is engaged in the socket 5 by rotating the body portion until the lower face of its bottom is moved into flat contacting engagement with the upper face of the flat mounting disc. By this time the portions of the walls of the body which extend below the bottom will fit snugly about the margins of the mounting disc thereby serving to conceal this disc and in addition to improving the appearance of the cuspidor when in place, also serving to brace the cuspidor against transverse strain in case it should be accidentally struck. Therefore the stem will be prevented from being bent and the cuspidor will be retained in a vertical position.

The upper portion of the body or receptacle has its walls internally thickened and threaded as shown at 11 for engagement by a depending externally threaded annular flange 12 carried by a ring or collar 13 which is formed of strong metal and of such dimensions that it projects radially beyond the upper end of the receptacle and has its inner marginal portion extending inwardly and formed with a downwardly curved annular lip 14. By this arrangement the collar or ring may be easily grasped when it is to be unscrewed or replaced and in addition material will be guided through the collar into a conical deflector or mouth 15 which extends downwardly from the flange and is provided with a tubular extension or spout 16 of sufficient length to have its lower end terminate near the bottom 2 of the receptacle, but not close enough to the bottom to prevent cigarette or cigar stubs from becoming caught between the bottom and lower end of the spout and causing the spout to become clogged.

The upper marginal portion of the deflector or mouth 15 which fits snugly against the collar and its depending annular flange 12 is firmly secured by being brazed or soldered thereto for practically its entire circumference as shown at 16 and in order to permit air to enter or leave the space between the mouth and the walls of the receptacle there has been provided a slot 17 formed near the upper edge of the deflector and extending circumferentially thereof for a short distance. Therefore if the receptacle is partially filled with water and the ring or collar 13 applied, air trapped in the receptacle by the lower end of the spout 16 extending into water will be permitted to escape through the slot 17 and the ring may be screwed tightly into place without an air cushion being formed which would be liable to force the water too far up into the spout. This will also prevent the formation of a vacuum in the upper portion of the receptacle.

When the cuspidor is to be emptied it is unscrewed from the mounting disc and after being carried to a suitable place of disposal the collar may be unscrewed and together with the deflector or mouth removed from the receptacle. The contents of the receptacle may then be emptied and after the receptacle and the collar and deflector have been thoroughly cleaned, the flange 12 is screwed tightly into engagement with the threads of the receptacle. The cuspidor may then be returned to its position either in front of the driver's seat or in the rear portion of an automobile.

A roughened surface 18 has been formed about the walls of the receptacle to act as a striking surface for matches. This will also provide a roughened surface and prevent the cuspidor from being liable to slip out of a person's hand while being carried from one place to another. Even if the cuspidor should happen to fall over while being set in place or removed, the proportions of the deflector and its spout are such that water and other liquid in the receptacle will be prevented from flowing out of the same.

What is claimed is:

1. A cuspidor comprising a receptacle having its walls extending below its bottom, the bottom being formed with a threaded socket centrally located and opening through its under face, and a mounting disk adapted to be secured in place, said disk being of dimensions to fit snugly in place beneath the bottom with its marginal edge bearing against the extended walls of the receptacle and having a threaded stem engaged in the socket to releasably hold the receptacle in engagement with the disk.

2. A cuspidor comprising a receptacle having its walls extending below its bottom, the bottom being of greater thickness than the walls and having its central portion extended upwardly and formed with a threaded socket opening through the underface of the bottom, a mounting disk of dimensions to fit snugly into space beneath the bottom with lower portions of the walls surrounding the disk, fastener receiving openings being formed through the disk whereby the disk may be secured upon a support, and a threaded stem rising from said disk centrally thereof and received in the socket to releasably secure the receptacle in connection with the mounting disk.

3. A cuspidor comprising a receptacle having a bottom and walls, the walls having lower portions extending downwardly below the bottom and a mounting of the same diameter as the bottom fitting against the under face of the bottom with said lower portions of the walls bearing against the marginal edges of said mounting, the mounting being adapted to be secured upon a support and the bottom and mounting being provided one with a threaded socket and the other with a threaded stem to engage in the socket and releasably retain the receptacle in engagement with the mounting.

4. A cuspidor comprising a receptacle having a bottom and walls, the walls having lower portions extending downwardly below the bottom and a mounting of the same diameter as the bottom bearing against the under face of the bottom and detachably connected therewith with the lower portions of the walls bearing against the marginal edge of the mounting to conceal the mounting and brace the receptacle against transverse movement.

In testimony whereof I affix my signature.
JOSEPH H. GAULT. [L. S.]